April 21, 1970  W. G. GILL  3,507,330
METHOD AND APPARATUS FOR SECONDARY RECOVERY OF OIL
Filed Sept. 30, 1968  6 Sheets-Sheet 1

Fig. 1

INVENTOR
William G. Gill
BY
ATTORNEY

INVENTOR

William G. Gill

ATTORNEY

United States Patent Office

3,507,330
Patented Apr. 21, 1970

3,507,330
METHOD AND APPARATUS FOR SECONDARY RECOVERY OF OIL
William G. Gill, Corpus Christi, Tex., assignor to The Electrothermic Co., Corpus Christi, Tex., a corporation of Nevada
Continuation-in-part of application Ser. No. 677,836, Oct. 16, 1967, which is a continuation-in-part of application Ser. No. 449,077, Apr. 19, 1965. This application Sept. 30, 1968, Ser. No. 767,917
Int. Cl. E21b *43/00, 43/22, 43/24*
U.S. Cl. 166—248                                27 Claims

ABSTRACT OF THE DISCLOSURE

Apparatus for the secondary recovery of oil in which electrical current is caused to flow through water in an oil bearing formation with the current path through the formation being sufficiently long to provide the necessary resistance to produce the desired amount of heating. One current path to the formation includes the tubing in one well. The second current path to the formation is either through the tubing and casing in a spaced apart well or through the casing in the one well. The insulating means disclosed is either a string of conductive tubing positioned between the tubing in the casing or insulating centralizers so positioned. In one embodiment of the invention, the casing includes an intermediate insulating section and in another embodiment, the lower portion of the casing is of insulating material. In still another embodiment of the invention, the insulating tubing extends below the casing a sufficient amount to provide current path through the formation of the necessary length with the tubing extending below the insulating tubing.

CROSS REFERENCE

This application is a continuation-in-part of co-pending application Ser. No. 677,836 filed Oct. 16, 1967—now abandoned which is a continuation-in-part of application Ser. No. 449,077 filed Apr. 19, 1965—also now abandoned.

During the early years of the oil industry, it was relatively easy to find new reserves and as soon as the amount of oil being pumped from a well fell below that required to maintain operation of the well profitable, the well would be shut down and abandoned. At the present time, however, the major share of existing onshore oil in the United States has probably been discovered. The conclusion is inescapable that the future of the domestic oil industry is closely tied to the efficient, economic production of known petroleum reserves.

It has been estimated that at least 50% of the known petroleum reserves of the United States cannot be recovered using conventional pumping methods. Accordingly, a substantial amount of effort of the petroleum industry will fall under the general category of secondary recovery. Thus, a system of secondary recovery known as water flooding has attracted a substantial amount of attention in recent years and several water flood projects have been established. In the water flood method of secondary recovery, water is pumped into either existing wells or injection wells which are drilled at particular locations. Since the oil is lighter than water and substantially immiscible therewith, the pumping of water into the formations tend to cause the oil to flow ahead of the water toward wells which are pumped to recover the oil.

Very recently the attention of petroleum engineers has been attracted to secondary recovery techniques referred to by the general term "thermal flooding". While conventional water flood techniques are aimed at stimulating existing production by increasing the natural reservoir pressure hydraulically, thermal flooding, as described, is a technique whose aim is the alteration of certain physical properties of the reservoir by means of the addition of heat. Reservoir pressure may or may not be increased in the process.

The three general methods of application of these recovery techniques are in situ burning (fire flood), steam injection, and hot water flood. In the first of these, controlled burning of some of the petroleum in place generates heat that lowers the viscosity of the remaining oil and pressure that improves reservoir drive. Steam injection is aimed at utilizing the heat of vaporization of water to lower the viscosity of the oil for a limited distance around the well bore. Generally, steam injection does not materially change the effective reservoir pressure. In the third method, the effect of normal water flood on a high viscosity reservoir is enhanced by preheating the flood water. All of these methods require extensive, and quite expensive, surface installations for their implementation.

The present invention provides improved apparatus for the secondary recovery of oil. The apparatus of the present invention can be used either for heating connate water present in the formation to stimulate production in a well or it can be used to obtain substantially the same effect as a steam or water flood.

Many objects and advantages of the invention will become obvious to those skilled in the art as a detailed description of preferred embodiments of the invention unfold with reference to the drawings in which.

Among the basic parameters determining petroleum reservoir performance, three primary forces must be considered. These are the forces of capillary action, the force of gravity, and the forces of viscous resistance. The action of these basic forces determine certain important reservoir factors. These factors are the original distribution of fluids within the reservoir, the simultaneous movement of fluids through the reservoir and the displacement of one fluid by another within the reservoir. The forces themselves and phenomena resulting from their interplay are dependent upon a number of reservoir fluid parameters including formation viscosity and permeability, viscosity of the fluid, pressure differentials within the reservoir, composition of the fluid, the temperatures of the reservoir, and a number of variables connected with the rock matrix itself.

The action of the force of gravity in reservoir mechanics is somewhat obvious. Its operation is apparent in the segregation of fluids within a reservoir and in down structure drainage.

The forces of viscous resistance are retarding forces against which work must be performed in producing fluid from a reservoir. They are active in direct proportion to the pressure differentials within the reservoir, and depend on reservoir type and the characteristics of the fluid in place.

The most subtle of the forces involved in reservoir mechanics are those involving capillary action. It is through these forces that connate water is retained within an oil zone in spite of the action of gravity tending to remove it to the bottom of the reservoir. It is also in large measure responsible for residual oil remaining within the reservoir pore space, in opposition to the producing differential. All three of the forces mentioned are of surface forces and act in direct proportion to the surface area involved in the reservoir production.

Two general conditions are required for a reservoir to be productive. First, a driving force between the reservoir and the well bore must be present. Energy for the driving force may be supplied naturally in the form of gas, either free or in solution, evolved under a reduction in pressure. The energy may involve a hydrostatic head of water behind the oil, or oil or water under compression. In cases where the natural energy sources are not sufficient to overcome the retarding forces within the reservoir, external energy must be added. Secondly, the produced fluid must be displaced by another fluid, either gas or water. The type of driving energy available determines the nature of the displacing substance.

Reservoirs are ordinarily classified according to the type of reservoir energy that is available. The four types are solution gas drive reservoirs, gas expansion reservoirs, water driving reservoirs, and gravitational drainage reservoirs. A particular reservoir may, of course, involve more than one of these producing mechanisms.

In those cases where the natural energy of the reservoir is insufficient to overcome the resistive forces such as the forces of viscous resistance and the forces of capillary action, external energy must be applied. The particular manner in which external energy is supplied will be dependent to a substantial degree upon the characteristics of the formation which the forces predominate.

Figure 1:
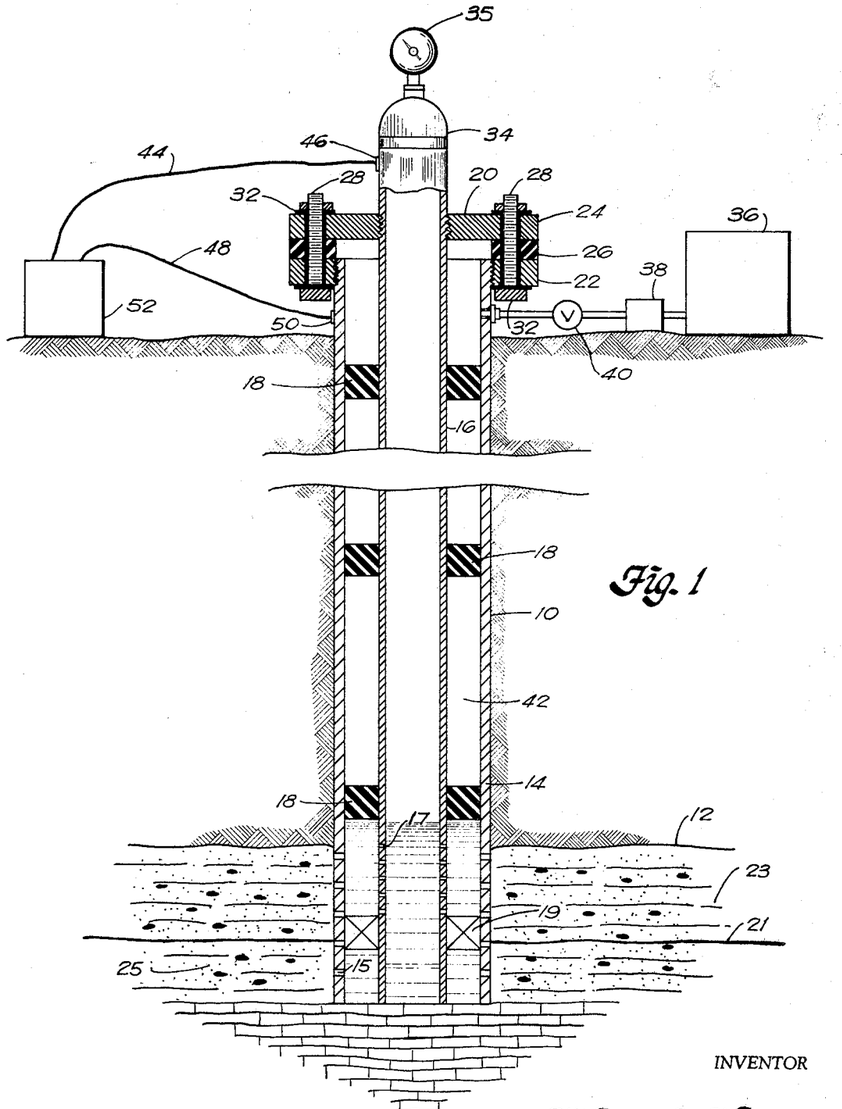
FIGURE 1 is a view diagrammatically illustrating a well bore penetrating the formation adapted for producing steam in the formation in accordance with one embodiment of the present invention.

Turning now to FIGURE 1 of the drawings, there is shown a well bore 10 which penetrates the surface of the earth into an oil bearing formation 12. A string of casing 14 extends from the surface into the formation 12. A string of tubing 16 is supported within the casing 14. The casing 14 and tubing 16 are perforated at 15 and 17 respectively to permit oil to enter the tubing from the formation. However, for reasons that will become apparent, the tubing is preferably not perforated below a packer 19, which may be provided in some instances.

A plurality of insulating members 18 encircle the tubing 16 at spaced apart locations for centering the tubing within the casing and electrically insulating the tubing from the casing. If it is desired to produce oil from the well, an insulating packer member 19 can suitably be positioned between the casing 14 and tubing at a level approximately the same as the interface 21 between the oil 23 and connate water 25 found within the formation 12.

The tubing 16 is suitably supported within the casing 14 by reducing flange 20 which comprises a first flange member 22 threadedly connected to the upper end of the casing 14 and a second flange member 24 threadedly connected to the tubing 16 near its upper end. Annular member 26 of insulating material separates flange member 22 from flange member 24. The two flange members can be held together if necessary either by utilizing bolts 28 of insulating material, suitably Teflon or nylon, or passing the bolts 28 through tubes 30 of insulating material and providing insulating washers 32 beneath the head of the bolt and the nut of the bolt. Tubing 16 is terminated in a cap 34 to which a gage 35 is suitably mounted.

There is also provided a sealed tank 36 which is connected through flow control choke 38 and valve 40 to the casing 14. When valve 40 is open, the pressure within the tank 36 will become equal to the pressure within the annulus 42 between casing 14 and tubing 16. Thereafter water will flow from the tank 36 into the annulus 42 at a rate controlled by choke 38.

Figure 2:
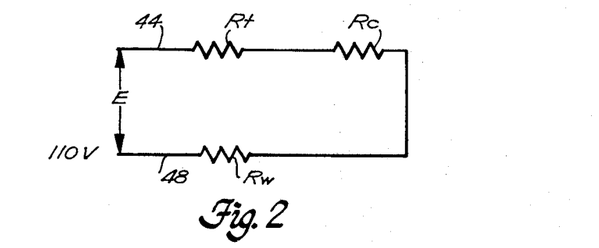
FIGURE 2 schematically illustrates the path for flow of current in accordance with the one embodiment of the invention.

A conductor member 44 is electrically connected to tubing string 16 at point 46 and a second conductor member 48 is connected to the casing string at 50. Conductors 44 and 48 are connected to a source 52 of alternating current supply voltage. The connate water 25 normally present will pass through the perforations 15, filling the lowermost portions of the annulus 42. Since connate water normally contains several salts in solution, it is an effective conductor of electricity. When a source 52 of alternating current supply voltage is connected between conductors 44 and 48, current will flow through a series path comprising conductor 44, the resistance of the tubing, designated $R_t$, the resistance of the water 25, designated $R_w$, the resistance of the casing, designated $R_c$ and conductor 48, as shown in FIGURE 2. The current flowing in this circuit can be expressed mathematically as:

$$1 = \frac{E}{R_t + R_c + R_w}$$

and the power dissipated in the water, or utilized for heating the water to convert it to steam will, of course, be equal to $1^2 R_w$. It will, therefore, be apparent that it is very desirable that the resistance of the water providing a conductive path between the casing 12 and the tubing 14 have a high resistance as compared to the total series resistance of the casing and tubing, $R_c + R_t$. In fact, to achieve this relationship in some instances it may be desirable to utilize tubing formed of aluminum or similar material characterized by a lower resistivity than steel, which is conventionally used for tubing. The current flowing can be controlled by varying the supply voltage potential or by varying the resistivity of the water.

As a result of the flow of current through the water, the water will become heated and converted into steam. As the water is converted into steam, the steam will expand and move into the oil bearing formation, heating the oil in front of the steam in a manner characteristic of steam floods presently used. However, in this instance, rather than generate the steam at the surface and pump it into the well, a portion of the annulus of the well and the oil bearing formation itself is utilized as a boiler for generating steam immediately adjacent the point at which it is to be used. Substantially improved results are achieved in that a substantial amount of the thermal energy available in a quantity of steam is not dissipated in the course of pumping the steam down the well bore. Steam of the maximum temperature is, accordingly, available for treatment of the formation.

As current continues to flow, all of the water 25 within the annulus 42 will be converted to steam, which is not an electrical conductor. The resistance shown schematically in FIGURE 2 as $R_w$ will, therefore, become extremely high and essentially an open circuit. Current will cease to flow through the electrical circuit and additional steam will not be generated. It is, therefore, necessary to maintain a supply of water in contact with both the casing 14 and tubing 16. It will be noted that the well could be fitted with a conventional pump for purposes of producing oil or for removing undesired oil if the well is to be used only for producing steam.

In some instances wherein it is desired to produce oil from the well, best results can be obtained by setting the packer 19. Water flowing down annulus 42 from tank 36 will flow out perforations 15 above packer 19 and in perforations 15 below the packer 19. With such an arrangement, there will be less tendency for the steam to push the oil away from the well bore, but rather the steam will be generated below the oil-water interface 21 and ejected outward to heat the surrounding formation and leach the oil from the sands.

Figure 3:
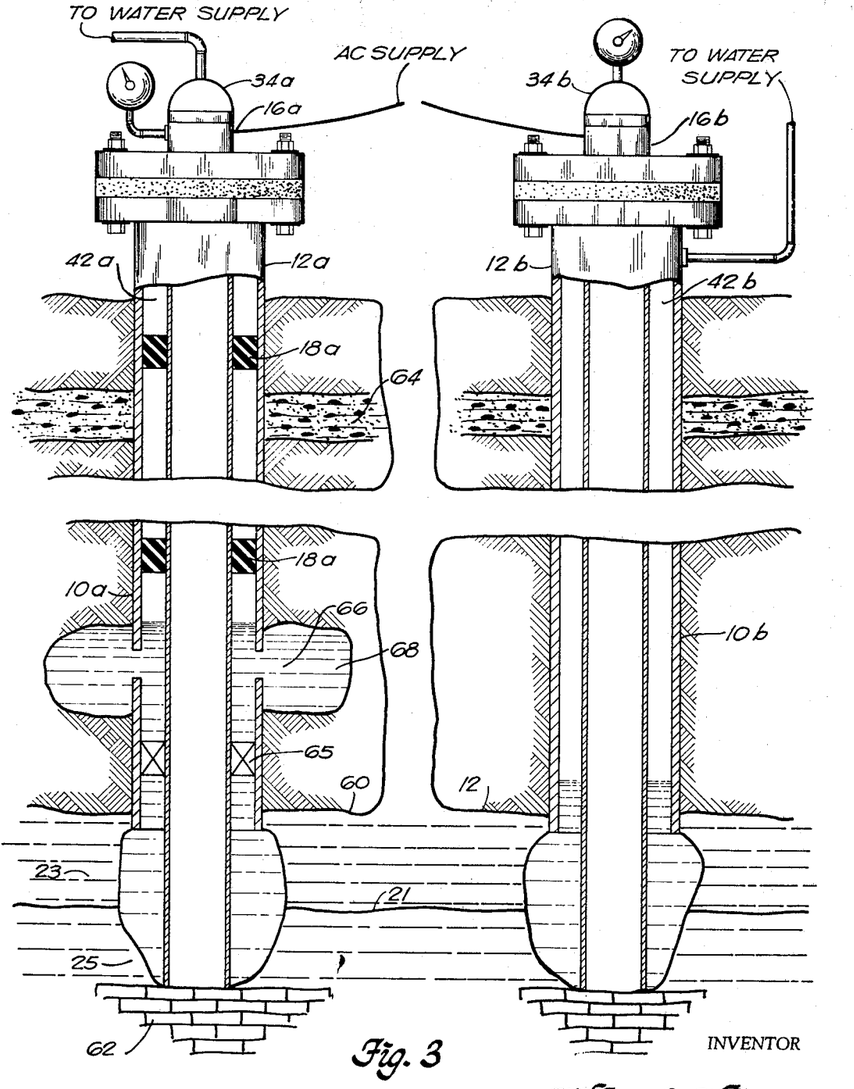
FIGURE 3 is a view diagrammatically illustrating two spaced apart well bores penetrating an oil bearing formation and adapted for practicing a second embodiment of the invention.

Turning now to FIGURE 3 of the drawings, there is shown a second embodiment of the invention wherein current is caused to flow through oil bearing formation 12 between two spaced apart well bores 10a and 10b. In practicing this second embodiment of the invention, advantage is taken of the fact that formation 60 overlying the oil bearing foundation 12 and formation 62 underlying the oil bearing formation 12 are normally relatively solid and do not contain fluids, while a substantial amount of connate water is normally present within the oil bearing formation 12.

Current flows between the tubing 16a and tubing 16b through a conductive path comprising the water 25 held in the formation 12, resulting in the generation of substantial amounts of heat. Virtually all of the heat is produced within a relatively small radius of each well since a short distance from the wells the conductor effectively becomes one of indefinite area and substantially zero resistance. However, the heat generated can result in a substantial reduction in viscosity of fluids to be produced. Also, for a reason not completely understood, the combination of high current flow and heat has been found to be a highly effective emulsion breaker. In many fields this is very important.

It will be noted that the pair of wells 10a and 10b of FIGURE 3 are each equipped substantially in the same manner as that described with reference to FIGURE 1 of the drawings in order that the necessary supply of water can be maintained in contact with the tubing members 16a and 16b. Moreover, it will not be necessary to insulate the tubing of either well from ground or casing if the ground is dry and no water bearing strata such as the formation 64 are present. However, in most instances such water bearing formations are present, rendering it necessary to insulate the tubing of one well, such as well 10a from the formation 64. This can be accomplished by coating the casing 14a with an insulating material, such as an epoxy resin, but generally this is not an acceptable solution due to damage which is frequently done to such coatings in the course of setting the casing. One preferred manner for insulating the tubing of one well from the formation 64 or other water bearing formation is shown in FIGURE 3. Thus, in accordance with another embodiment of the invention, packer 65 is set in the annulus 42a between the formation 12 containing the oil to be produced and water bearing formation 64. The casing 14a is cut at 66 and oil 68 is pumped into annulus 42a. A portion of the oil 68 is held within the annulus 42a by the insulating packer 65, with the remainder permeating the formation adjacent the casing 14a. Insulators 18a are provided and the well head is insulated as described with reference to FIGURE 1.

Since well 10b is not insulated, water can be supplied as shown in FIGURE 1 through either the tubing 16b or annulus 42b. However, it is preferred that the annulus be used for supplying water to permit a pump to be used if desired. On the other hand, the presence of packer 65 precludes the use of annulus 42a for supplying water to well 10a, and tubing 16a must be used. Moreover, the water supply must be insulated from ground since the tubing 16a is necessarily insulated from ground.

It will also be noted that the installation of FIGURE 3 is no dangerous in that only one wire of the electrical circuit is present at either of the two wells and that this wire or any portion of the well connected thereto can be touched with complete safety.

The embodiment of the invention shown in FIGURES 1 and 3 of the drawings utilize wells completed in conventional fashion except for provision of the insulating members 18a and cutting of casing 14a.

Figure 4:
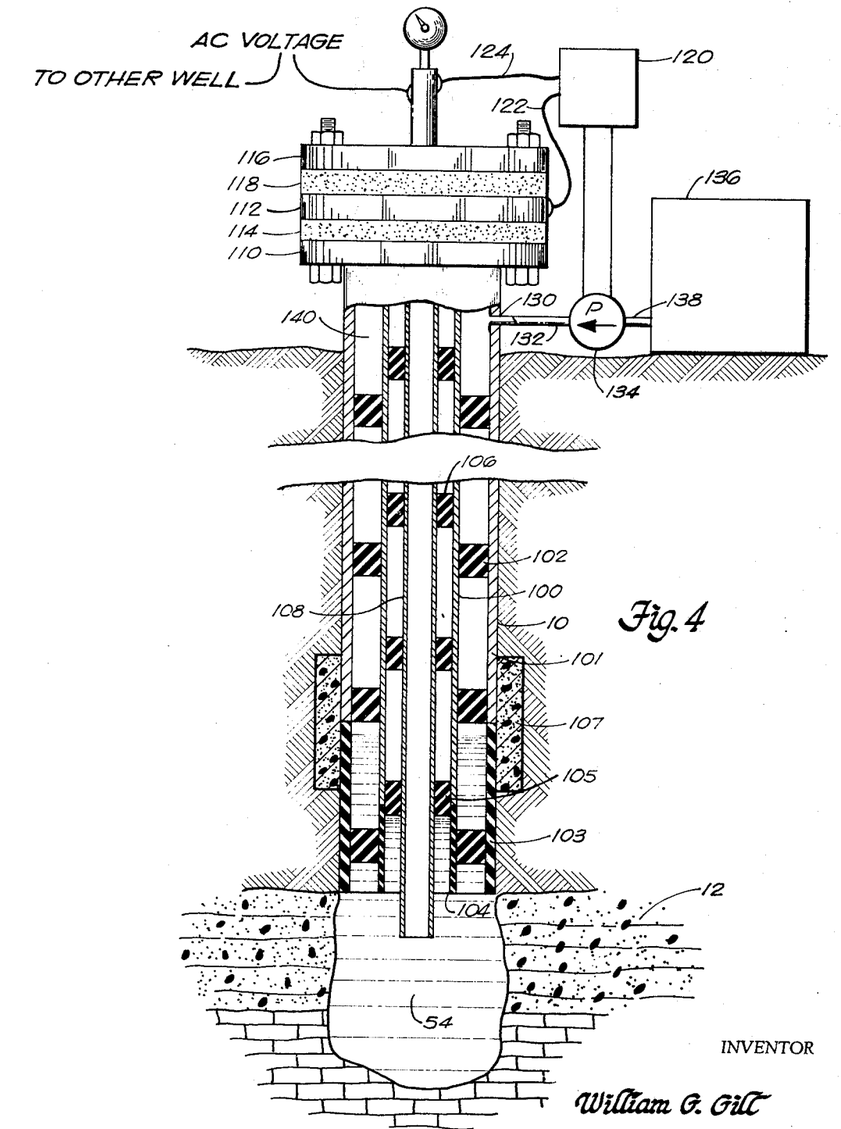
FIGURE 4 is a diagrammatic view of a well bore penetrating an oil bearing formation and especially equipped for practicing the second embodiment of the present invention.
Figure 5:
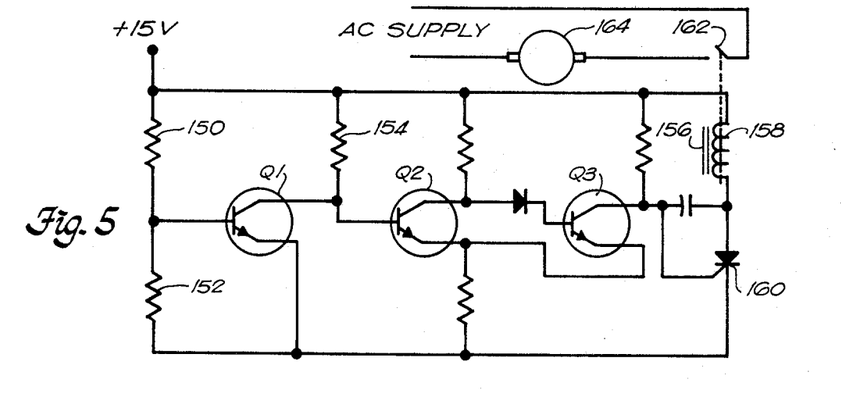
FIGURE 5 is a schematic diagram illustrating electrical circuitry suitable for controlling the injection of makeup water into a well.

Turning now to FIGURES 4 and 5 of the drawings, there is shown an installation especially equipped for use as an electrode well when water is to be injected into the formation. Thus, as shown in FIGURE 4, a well bore 10 extends from the surface of the ground into oil containing strata 12. As mentioned previously with reference to FIGURES 1 and 3 of the drawings, the formations 60 and 62 above and below the oil bearing strata are normally of a material substantially impervious to the liquids such that oil and gas are trapped in the formation 12. Also, water will normally be present in the formation 12 and underlying the oil bearing sand.

There is also provided a string of tubing 100 which passes through a string of casing 101. Insulating members 102 are provided for positioning the tubing 100 within the casing 101 and insulating the two from one another. The tubing 100 includes a portion 104 formed of insulating material. The insulating portion 104 of tubing 100 extends upward into the casing 14 to a point 105 established by the water level it is desired to maintain. In some applications in which it is not necessary that the tubing extend to a point adjacent the formation 12, it is practical to terminate the tubing 100 at the point 105 at which it becomes insulated. The casing 14 also includes an insulating lower portion, designated by reference character 103. The insulating portion 103 terminates above point 105. The portion 103 should be sufficiently long that the current path through the formation between the tubing and the upper portion is sufficiently long to provide a desired resistance. It is practical for the portion 103 to be positioned partially in the formation 12 and partially in the overlying strata. A high density cement 107 is provided in the region of the upper end of portion 103 to obviate the possibility that a conductive path may be provided to strata 12 from an upper water bearing strata. Positioned within the tubing 100 and insulated therefrom by insulating members 106 is an electrode member 108, also suitably formed of tubing. For instance, in a practical installation, the tubing 100 may be 2⅞" diameter and the tubing 108 may be of 1" diameter. The tubing 108 extends below the portion 103, as shown.

A flange member 110 is threadedly connected to the string of casing 14 at its upper end and a second flange member 112 is threadedly connected to the string 100 of tubing at its upper end. An insulating gasket 114 is positioned between the flange 110 and the flange 112 for electrically insulating the two one from the other and, also, for providing the necessary sealing function. Still a third flange member 116 is threadedly connected to the member 108, and a gasket 118, also of insulating material, is provided between flanges 112 and 116 for insulating the two and sealing the juncture therebetween. Suitable means, not shown, are also provided for connecting the flanges 110, 112 and 116 into a unitary structure.

There is also provided a control circuit 120 having input leads 112 and 124 electrically connected to the tubing 100 and the member 108, respectively. A T 130 is mounted on the surface of casing 14 for connecting one end of a length of pipe 132 to the casing 14, the other end of the length of pipe 132 being connected to the output of pump 134. The inlet of pump 134 is connected to tank 136 adapted to contain a supply of makeup water by pipe 138. When the pump 134 is actuated by the control circuit 120, it will pump water from the tank 136 into the annulus 140 between the casing 14 and the tubing 100. The water will then flow through the annulus 140 to the cavity 54 at the bottom of the well bore 10. It will be noted that all of the insulators used in all embodiments of the invention suitably are of a spider type configuration to permit the passage of fluids.

A source of alternating current supply voltage is shown connected between the member 108 and a similar member 108 positioned in a different well bore similarly equipped, producing a flow of electrical current in the formation 12 which is effective to heat the water present in the formation. Alternatively, the supply voltage can be connected between the tubing 108 and the upper conductive casing 101. In such an instance, it is preferred that the insulating portion 103 extend into the formation.

When the water level in the annulus 140 falls below point 105 of the tubing, pump control 120 will be effective to apply power to pump 134, causing makeup water to flow into annulus 140. At such time as the water in the annulus 140 again rises to a point above point 105, pump 134 will be shut off. If desired, a time delay may be incorporated into the starting and stopping of the pump to increase the time intervals between starting and stopping of the pump. It will be noted that an installation comprising the casing and tubing 108 but without tubing 100, the pump and its control can be used if it is not necessary to add water, as when the connate water is to be heated for the purpose of heating the formation to reduce the viscosity of the oil in the formation.

A control circuit 120 suitable for use in practicing the invention is shown in FIGURE 5 of the drawings wherein the resistor 150 represents the resistance between tubing member 100 and member 108. It will be appreciated that when the water in the annulus 140 extends above point 105, the resistance of resistor 150 will be relatively low and when the water level in the annulus 140 is below point 105, the resistance of resistor 150 will be very high.

There are also provided three transistors, $Q_1$, $Q_2$, and $Q_3$. Transistors $Q_2$ and $Q_3$ are connected in a conventional Schmitt trigger circuit. The base of transistor $Q_1$ is connected to the juncture between resistor 150 and resistor 152, with the resistors 150 and 152 being connected between a source of +15 volts and ground. The emitter of transistor $Q_1$ is also connected to ground, the collector of transistor $Q_1$ being connected to +15 volts through resistor 154.

There is also provided a relay 156 having a coil 158. Coil 158 is connected in series with the power electrodes of a silicon controlled rectifier 160 between +15 volts and ground. Relay 156 also includes a normally open contact 162 which is connected in series with the motor 164 which drives pump 134 and a source of alternating current supply voltage. Thus, when relay 156 is energized, power will be applied to drive the pump 134, causing water to be pumped from the tank 136 into the annulus 140. The collector of transistor $Q_3$ is connected through resistor 166 to the gate electrode of silicon controlled rectifier 160 and through capacitor 168 to the anode of silicon controlled rectifier 160.

A low resistance of resistor 150, resulting from the water level in the annulus 140 being above point 105, will bias the transistor $Q_1$ to be conducting, causing transistor $Q_2$ to be biased off and transistor $Q_3$ to be biased on. Silicon controlled rectifier 160 will be in its normally high impedance state and relay 156 will not be energized. If the water level in the annulus 140 falls below the level 105, the resistance of resistor 150 will increase, causing transistor $Q_1$ to turn off. When transistor $Q_1$ is turned off, transistor $Q_2$ will be biased on and transistor $Q_3$ will be biased off. When transistor $Q_3$ turns off, a biasing signal will be applied to cause the silicon controlled rectifier 160 to switch to its low impedance state, permitting current to flow through the coil of relay 158, resulting in closure of contact 162. Upon closure of the contact 162, power will be applied to cause the motor 164 to drive pump 134, resulting in water being pumped from tank 136 in the annulus 146. When sufficient water is pumped into the annulus 140 to cause the water level to rise again above point 105, the resistance of resistor 150 will again become quite small, biasing transistor $Q_1$ on. As transistor $Q_1$ turns on, transistor $Q_2$ will turn off and transistor $Q_3$ will turn on, causing the collector of transistor $Q_3$ to become less positive. The change in potential at the collector of transistor $Q_3$ is differentiated by capacitor 168 and applied to the anode of silicon controlled rectifier 160 as a negative going pulse which is effective to turn the silicon controlled rectifier 160 off. When silicon controlled rectifier 160 turns off, it will prevent further current flow through the coil of relay 156 and power will no longer be applied to the motor 164. Sufficient water will therefore be maintained at all times for purposes of producing steam without interruption in the flow of current, thereby providing maximum efficiency.

Figure 6:
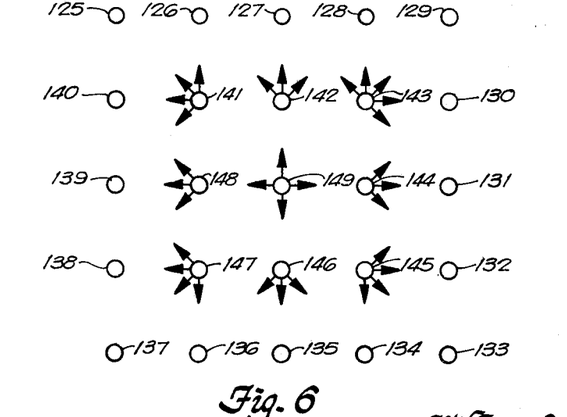
FIGURE 6 schematically illustrates the manner in which the principles of the present invention can be applied to produce a steam flood of a conventionally arranged oil field.

As indicated previously, individual wells equipped in the manner as that shown in the drawings can be utilized to produce steam or hot water. However, on a field-wide basis, best results are often obtained by connecting two wells in series in the manner described with reference to FIGURE 3 of the drawings. Turning now to FIGURE 6 of the drawings, many oil fields are arranged such that wells are drilled in a symmetrical, predetermined pattern with the wells generally grouped in squares, each well being equidistant from its adjacent well along either a vertical or horizontal line.

In practicing the present invention, it is practical to utilize a single well, such as well 149, for producing steam or hot water to increase the recovery from, for example, wells 141–148. At such time as substantially all of the oil has been recovered from that portion of the reservoir between well 149 and wells 141–148, separate current paths can be established between well 149 and each of wells 141–148. The entire area of the formation bounded by wells 141–148 then becomes effective as a large heat producing reservoir, with the heat produced in this reservoir serving to increase production of wells 125–140.

Over a period of time, the heat stored in the reservoir will slowly increase. Since the producing formation is normally a substantial distance below the surface of ground and since the heat is produced at the location at which it is to be utilized, the loss of heat is quite small. A large reservoir of steam or hot water with a large amount of stored thermal energy is thereby provided for purposes of increasing recovery from the wells surrounding the reservoir. As the surrounding wells are depleted, additional wells can be connected to electrical circuits to further increase the effective size of the heat reservoir.

Figure 7:
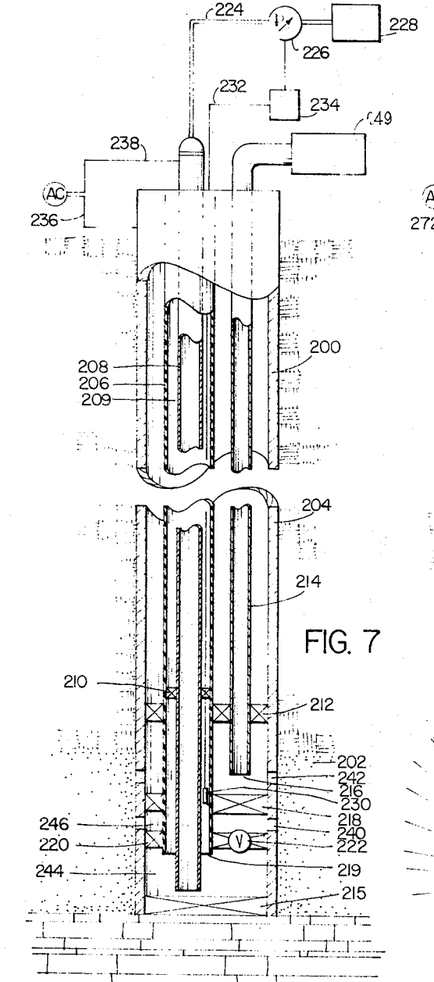
FIGURE 7 is a view diagrammatically illustrating a well bore penetrating an oil bearing formation and adapted for the practice of the invention wherein steam is injected into the formation.

There is shown in FIGURE 7 of the drawings a well bore 200 which penetrates the surface of the earth into an oil bearing formation 202. A string of casing 204 extends from the surface to the bottom of the well bore and suitably to the bottom of the formation. There is positioned within the casing 204 a string of pipe 206 which is suitably formed of fiberglass or similar insulating material capable of withstanding the environment of the bore hole during the practice of the invention. Positioned within the pipe 206 is a string of tubing 208.

A packer 210 is suitably set in the annulus between the insulated pipe 206 and the tubing 208 for limiting the height to which gases or fluids can rise in the annulus 209. Similarly, a packer 212 is placed in the casing 204 for sealing the space between the casing 204 and the tubing 214 and the pipe 204. A packer 215 is set in the bottom of the casing 204 for sealing the end thereof. However, the packer 215 may not be necessary depending upon the formation into which the end casing 204 extends. It will be noted that the string of pipe 206 extends below the end 216 of the string of tubing 214. Positioned in the annulus between the casing 204 and the string of insulated pipe 206 is additional packer 218. Still another packer 220 is set in the casing below the packer 218 but above the end 219 of the pipe 16. The packer 220 is provided with a pressure relief valve 222.

The string of tubing 208 is connected through a length of insulating hose 224 to the output of a pump 226. The inlet of the pump 226 is connected to a water reservoir 228. There is also suitably provided a sensing element 230 which is positioned in the annulus between the insulating pipe 206 and the length of tubing 208 and below the packer 210. The sensing element 230 is connected by conductor 232 to pump control 234.

The casing 204 and the tubing 208 are connected by conductors 236 and 238, respectively, to a source of alternating current supply voltage. Perforations 240 are provided in the casing 204 between packer 218 and packer 220 and additional perforations 242 are provided in the casing 204 above packer 218 and below packer 212, with all of the perforations opening into the oil bearing formation 202. Sealing and insulating means of the general type shown in FIGURES 1, 3 and 4 can be provided, if desired or necessary, for sealing the open ends of the casing and pipe at the surface.

In operation of the apparatus shown in FIGURE 7, the pump 226 will apply water from the reservoir 228 through hose 224 and tubing 208 into the portion of casing 204 extending between packer 215 and packer 220 with water rising into the annulus between insulated pipe 206 and tubing 208 until water reaches the level of sensing element 230. When the water reaches the sensing element 40 contacts therein will be shorted and a signal applied to pump control 234, causing the pump to be shut down.

The water in the tank 228 which is applied to a reservoir 244 is suitably mixed with conductive salts such that the resistivity of water in the reservoir 244 will provide the desired resistance between tubing 208 and casing 204. Accordingly, current will flow in a circuit comprising conductor 236, casing 204 and water in the reservoir 244, tubing 208 and conductor 238, resulting in heating of the water.

When the water is heated to its boiling point, steam will be formed. The energy dissipated as current flows through the tubing 208 will, of course, heat the water flowing through the tubing 208. The amount of energy dissipated in the tubing is substantially greater than the energy dissipated in the casing 204, assuming the two are of the same material, but much less than the energy dissipated at the bottom of the bore hole. However, the packer 220 and the packer 210 prevent escape of the steam from the reservoir 244.

When the water is heated to a temperature at which the pressure within the reservoir 244 becomes sufficiently high, valve 222 will open, permitting release of steam into portion 246 of the annulus between the casing and the insulated pipe and the steam will escape into the formation through the perforations 240. The pressure relief valve 222 positioned in the packer 220 is adjusted such that the water in the reservoir 244 will be heated to a temperature substantially in excess of that at which the water could convert to steam if the steam were released into the formation at the formation pressures. As steam is released through the valve 224, additional water will be added by the pump 226 as the level of water falls below the sensing element 230. Moreover, the valve 222 will close if the temperature of water drops substantially, as the pressure within the reservoir 244 will drop also.

It will be noted that the results obtained using the method and apparatus described with reference to FIGURE 7 will be substantially the same as that obtained using a conventional steam flood or steam soak method. Accordingly, the formation would suitably be steamed for a period of time and then permitted to soak for a period of time. During the period of which the steam is present, the temperature of the formation in the vicinity of the bore hole would be raised substantially, reducing the viscosity of the fluids in place. The steam would also penetrate the formation tending to reduce the capillary action of the formation and break oil-water emulsions. Accordingly, there would be provided a large area in which the formation fluids would be very mobile and fluids from surrounding unheated formations would flow into this area, permitting substantial increase in productivity rate at such time as the well is produced. During production, the oil will flow into the casing through perforation 242 and flow or be pumped to the surface through tubing 214 by pump 249. Tubing 214 can be eliminated if the well is produced through the annulus of casing 204.

Attention is also called to the insulating hose 224 which connects the tubing 208 to the pump 226. It has been found that by using insulating tubing having a relatively small diameter and sufficiently long length, the column of water in the hose 224 will be of sufficiently high resistance as compared to the resistance path through the reservoir 244 and the tubing 208, casing 204 and the conductors 236 and 238 that the voltage appearing on the pump 226 and other parts of the system will not be substantial. For example, if the hose 224 is of 1" diameter and the concentration of conductive salts in the water is in the order of 15–18 parts per million, substantially no current will flow between the reservoir and the tubing.

Particular attention should also be directed toward the string of insulated pipe 206. As indicated previously, it is preferred that the pipe 206 be formed of fiberglass material. It will be noted that the purpose of the insulating pipe is to provide continuous insulation between the string of tubing 208, which functions as one electrode, and the casing 204 which functions as the second electrode. This function can be obtained using other means. For example, insulating spacers as described with reference to FIGURES 1, 3, and 4 can be used. It has been found, however, that as a practical matter, such devices are not entirely satisfactory from the standpoint that they can become broken from objects which fall into the casing and once they crack they will break down electrically under relatively low voltages. Also, the string of tubing 208 can be coated with an insulating material. This also has not proved completely satisfactory from the standpoint that the insulating coating does not always possess a desired degree of uniformity with the resultant possibility of shorts between the casing and the tubing. The particular manner chosen for providing the required insulating must be one which is quite durable and strong and can withstand both the electrical voltage which may be impressed across it, the physical wear and the temperatures which are present. In general, the fiberglass pipe has been found to provide superior characteristics.

Figure 8:
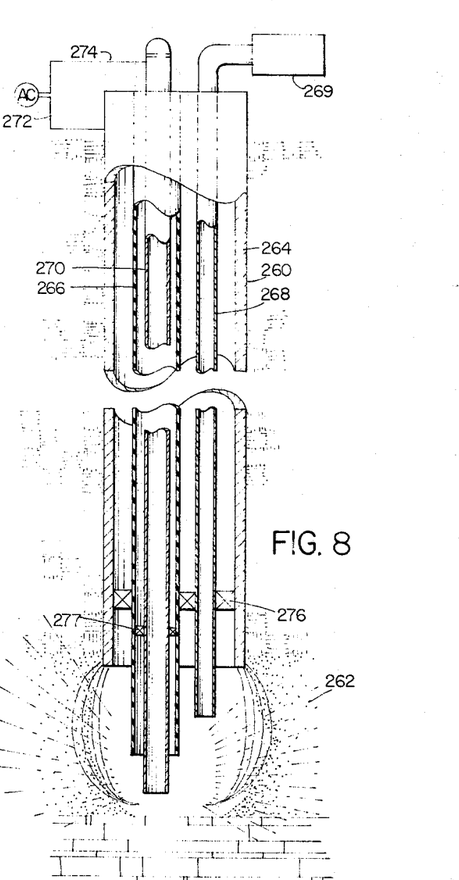
FIGURE 8 is a view diagrammatically illustrating a well bore penetrating an oil bearing formation and adapted for the practice of a different embodiment of the invention.

Another embodiment of the invention is shown in FIGURE 8 of the drawings. Thus, in FIGURE 8 of the drawings there is shown a bore hole 260 which extends from the surface of the earth into the oil bearing formation 262. A string of casing 264 extends from the surface, suitably to the upper portion of the formation 262. There is positioned within the casing 264 a string of insulating pipe 266 and a string of tubing 268. Positioned within the string of insulated pipe 266 is another string of tubing 270. The casing 264 and the tubing 270 are connected by conductors 272 and 274, respectively, to a source AC supply voltage. A packer 276 can be provided to prevent fluids rising up the annulus of casing 264 and a packer 277 can be provided to prevent fluids from rising up the annulus of pipe 266. The tubing 270 should extend below the insulating pipe 266 a distance to provide the desired amount of electrode. The insulating pipe 266 should extend below the casing 264 a sufficient distance that the current path through the formation between the tubing and the casing or tubing 268 is sufficiently long to provide a desired resistance.

The installation shown in FIGURE 8 can be operated for the practice of different methods. In accordance with one method, electrical current is caused to flow through the circuit comprising conductors 272 and 274, the casing 264 and the tubing 270 and water present in the region between the tubing 270 and the casing 276 to produce heating of the water in the strata 262. If sufficient connate water is not available, additional water can be injected through tubing 270, suitably using an installation of the type described with reference to FIGURE 7 of the drawings.

During the time that the water is being heated, sufficient fluid can be provided in the well bore to insure that the pressure at the bottom of the bore hole will maintain the water in a liquid state even though the temperature of the water is substantially in excess of that which the water would be converted to steam at the surface. In many instances, depending upon the reservoir pressure, it will not be necessary to pump the oil as it will flow to the surface due to the decrease in viscosity of the oil and reduction of the forces of viscous resistance and capillary action.

In accordance with a second method which can be practiced using an installation of the type shown in FIGURE 8, a hot water flood is provided. In the practice of this embodiment of the invention, water present in the formation is heated by the flow of electrical current as described above. Water is also injected into the formation through tubing 268 or tubing 270. It will be noted that tubing 268 will not be required if the water is injected through tubing 270 or if it is not necessary to inject water or pump through tubing 268. Water is injected under pressure and in quantities which would be suitable for conventional water flood operations.

The rate at which water is injected will be controlled in accordance with the amount of electrical energy dissipated in the formation to insure that water is heated to the desired temperature. It will be appreciated that due to the pressures present at the bottom of the bore hole substantial temperatures of the water can be obtained without producing steam. The advantage of the installation and method shown in FIGURE 8 is that the water is heated in the immediate vicinity of the formation rather than at the surface, as is true of most hot water flood systems. Accordingly, it is possible to use a water flood at depths deeper than would be practical using conventional installations.

In accordance with a third method that can be practiced using the installation of FIGURE 8, the packers 276 and 277 are removed and the casing and tubing is permitted to fill with fluids such that the pressure existing in the formation will be substantially greater than those at the surface. As electrical current flows heating the water in the formation, the temperature of the water will rise to substantial temperatures without being converted to steam. After the desired amount of thermal energy has been added to the formation, a portion of the fluid is removed from the well bore, decreasing the pressure at the bottom of the well bore, permitting the super heated water to be converted to steam. This steam will penetrate the formation 262 to a much greater extent than will the water providing a substantial increase in the mobility of the oil. Accordingly, the oil will flow into the heated area and into the well bore. In many instances, the oil will flow to the surface due to reservoir pressure as the steam and heat act upon the fluids in the formation, decreasing their viscosity and the viscous and capillary forces. However, if the reservoir pressure is not sufficient to cause the well to flow, the fluids can be pumped through tubing 268. It will be noted that it is possible to pump through tubing 270 and that if the fluids show flow, it would be possible to produce the well through the annulus of the tubing 264.

It has been found that the temperatures obtained using an installation such as shown in FIGURE 8 will become very high. By forming at least the bottom portion of the casing 264 and the insulated pipe 270 and the tubing 274 of materials having a melting point higher than the vaporization temperature of a mineral which is desired to be mined, it is practical to raise the temperature at the bottom of the bore hole to a level sufficient to produce vaporization of some of the lower melting point precious minerals. These minerals would be vaporized when the pressure is relieved from the bore hole and would condense on a suitable condensation plate. It would, therefore, be possible to use the method for mining certain minerals at extreme depths.

Figure 9:
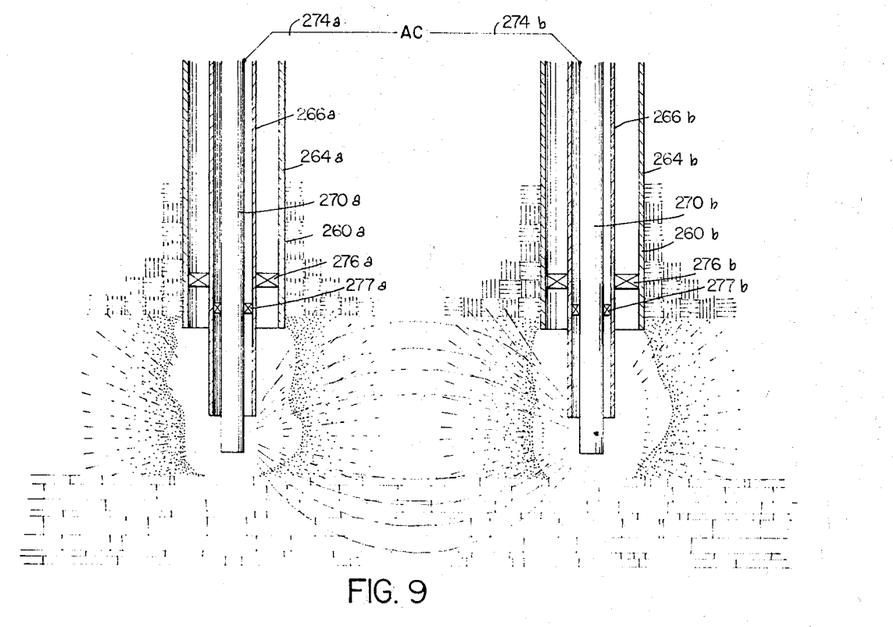
FIGURE 9 is a view similar to FIGURE 3 diagrammatically illustrating two spaced apart well bores penetrating an oil bearing formation in accordance with still another embodiment of the present invention.
Figure 10:
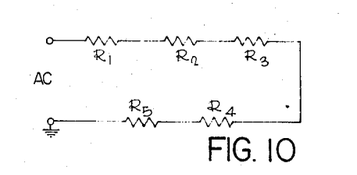
FIGURE 10 is a schematic diagram illustrating the path of current flow in the embodiments of the invention shown in FIGURES 3 and 9.

There is shown in FIGURE 9 of the drawings a different installation which can be used in substantially the same manner as the installation of FIGURE 10 or FIGURE 8. Thus, there is shown diagrammatically in FIGURE 3 two well bores 260a and 260b. As the installations shown in FIGURE 9 are substantially the same as that shown in FIGURE 8, the same reference characters have been applied. It will be noted that the only difference between the individual installations of FIGURE 9 and the installation of FIGURE 8 is that the tubing 268 has been eliminated and the source of alternating current power is connected across the two strings of tubing 270a and 270b in a manner similar to that described with reference to FIGURE 3.

The installation shown in FIGURE 9 is especially well adapted for producing a hot water flood. Accordingly, the separation between well bores 260a and 260b would be that accorded injection wells in a conventional hot water flood operation. When AC power is connected across the strings of tubing 270a and 270b by the conductors 274a and 274b, current will flow through the electrical circuit illustrated schematically in FIGURE 10.

The electrical circuit of FIGURE 10 can be seen to comprise five resistors $R_1$, $R_2$, $R_3$, $R_4$ and $R_5$ connected in series across a source of AC supply. The resistor $R_1$ represents the resistance of conductor 274a and the string of tubing 270a. The resistance $R_2$ represents the resistance of the water within a relatively small radius of the tubing 270a. This radius is the radius at which substantial heating of the water will occur and will normally be in the order of 10 to 15 feet. Similarly, resistor $R_5$ represents the resistance of conductor 274b and the string of tubing 270b while resistor $R_4$ represents the resistance of the water within a similar small radius of the tubing 270b.

The resistor $R_3$ represents the resistance to the flow of current through the earth between the two areas in which substantial heating occurs. It will be appreciated that due to the practically infinite area of the path through which electrical current flows between the two points that the value of resistance $R_3$ will be almost infinitely small and, accordingly, as mentioned previously with reference to FIGURE 3, virtually all of the power will be dissipated within a relatively small radius surrounding the tubing 270a and 270b, assuming that the resistance of the conductors 274a and 274b and the resistance of the tubing 270a and 270b is small. The resistance of the portion of the current path represented by resistors $R_2$ and $R_4$ will therefore, in a practical system, be much greater than the remaining resistance of the series system.

The operation of an installation as shown in FIGURE 9 can be similar to that described with reference to FIGURE 8 in that electrical current is caused to flow for the purpose of heating the water in the immediate vicinity of the well bores 260a and 260b. Additional water can be injected through tubing 270a and 270b to provide the necessary pressure and volume of water to produce a water flood. The amount of current flowing through the electrical circuit can be controlled in conjunction with the amount of water which is being injected to raise the water temperature to a desired level as the water leaves the tubing and is forced into the formation. Accordingly, a very efficient hot water flood can be provided.

An installation as shown in FIGURE 9 can also be operated to produce a steam flood by heating the water to sufficient temperatures to produce steam if the oil bearing strata is relatively shallow as described with reference to FIGURE 1, or by periodically relieving the pressure in the bore holes to permit conversion of the water to steam if substantial pressures are present at the formation level in the manner described with reference to FIGURE 8 of the drawings. In this connection, it will be noted that at even moderate depths the water can be heated to temperatures which will melt steel casing without producing steam.

It will also be noted that in the installations shown in FIGURES 8 and 9 of the drawings, the lower end of casing 264 is positioned a substantial distance, suitable twenty to thirty feet, above the lower end of the insulating pipe 266, suitably at the top of the oil bearing formation, with the tubing 270 extending a substantial distance into the oil bearing formation below the pipe 266. Virtually all of the effective heating occurs within a relatively short distance from the portion of the tubing from which current is permitted to flow and the insulating pipe 266 insures that the current must flow through the formation for a substantial distance before it flows through the casing 264. No particular effect has been made to insulate the casing 264 from condutive formations above the oil bearing formation since the casing 264 becomes a part of the infinite conductor connecting the two wells and the presence of an upper conductive strata does not adversely effect the operation. It will be observed that such a situation does not exist if insulators as described with reference to FIGURE 3 are provided since a very short conductive path is provided between the tubing and the casing, reducing the resistance to a very low level and causing most of the energy to be dissipated in the tubing and casing.

Figure 11:
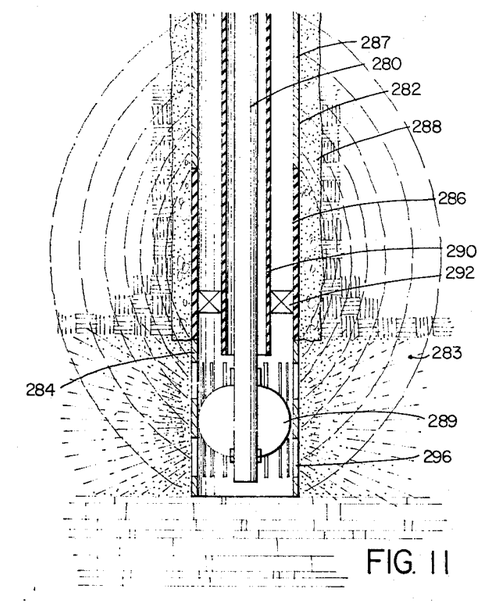
FIGURES 11 and 11a are views diagrammatically illustrating a well bore penetrating an oil bearing formation and especially adapted to produce improved results in the practice of the invention.
Figure 11A:
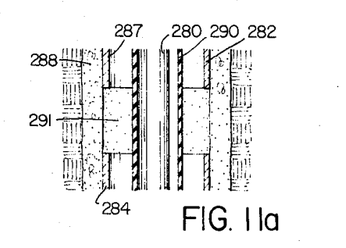

Turning now to FIGURES 11 and 11a of the drawings, there is shown an installation which can be suitably used in practice of the embodiments of the invention shown in FIGURES 8 and 9, but wherein substantially greater efficiency is provided. Thus, it has been found that the area of heating is a function of the radius of the electrode. The greater the radius of the electrode, the greater will be the area heated by the electrode. The installation of FIGURE 11 includes a length of tubing 280 which extends from the surface into an oil bearing formation 283, much in the manner of the tubing 208 of FIGURE 7 or tubing 270 of FIGURES 8 and 9. There is also provided a string of casing 282 which extends from the surface into and preferably through the oil bearing formation 283. The length of casing 282 includes a lower portion which is conductive and extends through the oil bearing formation, designated by the reference character 284, and a portion 286 of insulating material which suitably extends from the upper region of the oil bearing formation to a point above the oil bearing formation at which point it is mechanically connected to the upper portion 287 of casing 282.

The length of the insulated portion 286 is suitably that of conventional string of tubing, in the order of 20 to 30 feet. If can, however, be of shorter length as it is only necessary that the portion 286 be sufficiently long for the resistance of the current path through the formation to be sufficiently large as compared to the resistance of the casing and tubing to produce the desired heating. Reducing the length of portion 286 will provide a more direct path for the flow of current between tubing 280 and the upper portion of 287, reducing the area heated. The casing 282 is cemented in place from a point at or near the upper inner face of the oil bearing formation to a point above the length of the insulated portion. The cement reinforces the insulating portion 286 to prevent it from being crushed and also serves in a conventional manner to prevent caving of the well wall as fluids are removed from the formation. The cement is represented in the drawing by the reference character 288. A string of insulated pipe 290 which extends between the string of tubing 280 and the string of casing 282 is provided, preventing electrical connection between the two above the lower portion 284. A packer 292 can be set between the insulated pipe 290 and the string of casing 282 to prevent water rising in the annulus between the pipe 290 and the casing 282 to the upper portion 287. It will be noted that the bottom of the tubing 280 extends below the bottom of the string of insulated pipe 290, as does the string of casing 282.

It can readily be seen that the installation of FIGURE 11, as described of this point, is similar to that of FIGURE 4 except for provision of the lower portion 284, the use of the insulating tubing 290, and elimination of tubing 105. Accordingly, it is possible to not use the lower portion 284 and to insulate the tubing 280 from the upper conductive portion 287 by insulating spacers, although the tubing is preferred. Also, if insulating spacers are used, it is desirable to fill the annulus above packer 292 with oil if the annulus is not required in order to pump the well or for injecting fluids.

There is also provided means for electrically connecting the lower end of the string of tubing 280 to the lower portion 284 of the string of casing 282. A conventional steel centralizer 289 is suitable for performing this function. A plurality of slots 296 are formed in the lower portion 284 of the string of casing 282. At the surface, electrical connections are made to the casing 282 and to the tubing 280. The flow of current will thereby be down the string of tubing 280, through the centralizer 294 to the portion 284 of the casing 284, thence, through the oil bearing formation to the upper main portion 287 of the string of casing 282.

The radius of the casing is substantially greater than the radius of the tubing and, accordingly, a substantially greater area will be heated using the installation shown in FIGURE 11 than the installation shown in either FIGURES 8 or 9. An installation as shown in FIGURE 11 can be used in the embodiment shown in FIGURE 8 or the embodiment shown in FIGURE 9, with improved results being obtained in either instance due to increased radius of the electrode.

An alternative method for providing an insulating section between the lower portion 284 and the upper portion 287 of the casing 282 is shown in FIGURE 11a of the drawings. Thus, in FIGURE 11a there is shown a casing 282 which extends along a well bore 281. Positioned within the casing 282 is a string of insulating pipe 290 and a string of tubing 280, as described with reference to FIGURE 11. It will be noted that in FIGURE 11a, only a portion of the installation is shown, namely the portion which includes the upper end of the lower portion 284 and the lower end of the upper portion 287 of the casing 282. There is also shown in FIGURE 11a concrete which is positioned between the casing 282 and impregnates the surrounding formation, filing a portion of the well bore. To provide an installation as shown in FIGURE 11a, after the casing is cemented in place but prior to installation of the insulating pipe 290 and the tubing 280, a cutter is used to remove a section of the casing as indicated by reference character 291. Suitably, the casing is removed over a length of twenty to thirty feet. It will be noted that tools and methods of removing portions of casing are well known in the art and frequently used. It will also be noted that the concrete holds the lower portion 284 of the casing 282 in position, as well as the upper portion 287. Further, the concrete maintains the walls of the well bore. The removal of a portion of the casing accomplishes the same result as a provision of the insulating section 286 in that the lower portion 284 and upper portion 287 of the casing 282 are no longer connected by a low resistance path. Accordingly, a section shorter than twenty to thirty feet can be removed and still obtain good results. When current is caused to flow between the lower portion 284 of the casing and the upper portion 287 of the casing, the flow of current will be through the oil bearing formation, producing the desired heating of oil and water in the formation. An installation as shown in FIGURE 11 will most often be used in new wells and the installation as shown in FIGURE 11a will normally be used when existing, conventional wells are adapted for practice of the invention.

The above description of FIGURES 11 and 11a has been with reference to an installation in which the source of alternating current supply voltages connected between the tubing 280 and the upper portion 287 of casing 282, in which instance the installation can be operated in a manner similar to that described with reference to FIGURE 8 of the drawings. It will readily be appreciated, however, that greatly improved results would be obtained if an installation as shown in FIGURE 11 was used in the practice of the invention as disclosed with reference to FIGURES 3 and 9 of the drawings, in that the radius of the electrode is increased substantially, thereby greatly increasing the effective area which is heated. Thus, it would be practical to provide two spaced apart wells with an installation as shown in FIGURE 11 or 11a and thereafter connect a source of alternating current supply voltage between the tubing 280. It is also important to note that the installation shown in FIGURES 3, 4, 8, 9, 11 and 11a can be used to heat the water in the formation for purposes of reducing the viscosity of the oil in place without necessarily converting the water to steam or pumping water into the formation. The embodiment shown in FIGURES 11 and 11a are particularly useful in this regard because of the increased size of the electrode.

From the above, it can be seen that the present invention provides an improved apparatus and method of thermal recovery utilizing electrical current to produce heating of water at the bottom of a bore hole and in the surrounding oil bearing formation. Since heating is accomplished in the formation rather than at the surface, thermodynamic losses are maintained at a very low level, making it feasible to use electricity to produce the heating of water even though it is a much more expensive source of energy than hydrocarbon fuels. Further, the cost of the installation is only a fraction of that required in conventional thermal systems as large boilers are not required at the surface.

The combination of high thermodynamic efficiency and low installation cost makes it practical to utilize the present invention for the secondary recovery of oil from fields in which conventional methods of steam injection or hot water flooding would not be economically practical. For example, the present invention can be applied to the oil bearing formations located at much greater depths than at which it would be practical to utilize a conventional steam injection or hot water flood. The low installation cost means that the system can be applied on virtually an acre to acre basis, making it feasible to apply secondary recovery techniques either to small fields or to provide a pilot operation for determining the practicality of installing a much more expensive conventional steam injection or water flood system.

Although the invention has been described with reference to particular preferred embodiments thereof, many changes and modifications will be obvious to those skilled in the art.

What is claimed is:

1. A method of secondary recovery of oil from an oil bearing formation comprising:
    (a) drilling a well bore extending into said formation;
    (b) positioning a string of casing in said well bore;
    (c) positioning a string of tubing in said casing;
    (d) establishing an electrical circuit from said tubing through water in said formation adjacent the well bore; and
    (e) insulating said casing from said tubing whereby the current path between said casing and said tubing is through said formation and sufficiently long to provide a desired resistance.

2. A method of secondary recovery oil from an oil bearing formation comprising establishing an electric circuit through water positioned in a well bore extending into an oil bearing strata, maintaining sufficient pressure on said water as said water is heated by the flow of electrical current to prevent boiling of the water at temperatures substantially in excess of the boiling point of water at the surface of the bore hole, periodically relieving the pressure on the water when the water is heated to a temperature of at least the boiling point of water at the surface to permit conversion of the heated water into steam and recovering oil treated by said steam and heated water.

3. A method of secondary recovery of oil from an oil bearing formation comprising establishing an electrical circuit through water positioned in a well bore extending into an oil bearing strata, maintaining sufficient pressure on said water as said water is heated by the flow of electrical current to prevent boiling of the water at temperatures substantially in excess of the boiling water at the surface of the bore hole, confining the water through which current flows within a reservoir until the temperature of the water is sufficiently high to produce steam at the pressure present in the oil bearing strata, releasing water and steam into said strata and recovering oil treated by said steam and heated water.

4. A method of secondary recovery as defined in claim 3, further including the step maintaining at least a minimum quantity of water within said reservoir.

5. A methor of secondary recovery of oil from an oil bearing formation comprising establishing an electrical circuit through water positioned in a well bore extending into an oil bearing strata, maintaining sufficient pressure on said water as said water is heated by the flow of electric current to prevent the boiling of water at temperatures substantially in excess of the boiling point of water at the surface of the bore hole, establishing an insulating section in a string of otherwise conductive pipe with the lower section of said string of pipe being conductive and positioned in said formation and establishing an electrical circuit through said lower section and a conductive section of said string of pipe extending above the insulating section.

6. Apparatus for the recovery of oil from an oil bearing formation penetrated by at least one well bore comprising:
    (a) a string of casing positioned within said well bore and extending from the surface to said oil bearing formation;
    (b) a string of tubing of electrically conductive material positioned within said casing and extending from the surface into said oil bearing formation;
    (c) a string of pipe of insulating material extending from the surface and interposed between said casing and said tubing;
    (d) conductive means completing a low resistance electrical circuit through said tubing and water positioned in said formation adjacent said well bore to produce heating of said water in the immediate vicinity of said well bore.

7. Apparatus as defined in claim 6 wherein said string of tubing extends below said string of pipe of insulating material and said string of pipe of insulating material extends below said string of casing a sufficient distance that a current path through the formation between the string of tubing and the string of casing is sufficiently long to provide a desired resistance.

8. Apparatus as defined in claim 7 wherein said last named means comprises:

(a) a second string of tubing positioned in a second well bore spaced apart from the first mentioned well bore, said second well bore and said second string of tubing extending into said formation;

(b) a second string of casing and a second string of insulated pipe positioned in said second well bore extending to said formation with said second string of insulating pipe interposed between said second string of casing and said second string of tubing; and (c) means connecting said first and second strings of tubing to a source of alternating current supply voltage.

9. Apparatus as defined in claim 7 further including packer means set in the annulus of said casing for preventing fluids rising in said annulus above said packer means.

10. Apparatus as defined in claim 6 wherein said casing extends into said formation below said string of pipe of insulating material and said tubing further including sealing means for sealing the lower end of said casing, packer means positioned in the annulus of said casing, and the annulus of said insulating pipe above said sealing means, said packing means, said sealing means and walls of said casing defining a reservoir, means for maintaining at least a minimum quantity of water in said reservoir, and pressure sensitive means for releasing heated water and steam from said reservoir in said formation.

11. Apparatus as defined in claim 10 including means for sensing the level of water in said reservoir.

12. Apparatus as defined in claim 10 wherein said casing is perforated above said packer means and said pressure sensitive means is positioned in said packer means.

13. Apparatus as defined in claim 6, wherein a lower portion of said string of casing is positioned in said formation and electrically insulated from the portion of said casing extending to the surface, said lower portion of said casing being perforated, and further including means providing a resistance connection between said tubing and said lower portion of said casing and means connecting a source of alternating current supply voltage across said tubing and the portion of said casing extending to the surface providing an electrode of greater radius than said tubing.

14. Apparatus as defined in claim 13, including a section of insulating pipe mechanically connecting said lower and upper portion of said casing.

15. Apparatus as defined in claim 14 including means positioned for restricting the flow of current between said lower and upper portions of said casing along said well bore.

16. Apparatus as defined in claim 15, wherein said means positioned for restricting the flow of current comprises packer means for preventing the rise of water in the annulus of said casing to said upper portion of said casing and cement filling the space between said casing and the wall of said well bore and extending into the surrounding formation.

17. Apparatus as defined in claim 13, including a body of cement having a passageway formed therein mechanically connecting said lower and upper portions of said casing, said cement extending into the formation away from said bore hole.

18. Apparatus as defined in claim 6 wherein said string of pipe of insulating material extends below said string of casing and said string of tubing extends below said string of pipe of insulating material whereby the shortest path for current flow through water in said formation between said tubing and said casing is of substantial length and wherein a source of alternating current supply voltage is connected between said string of casing and said string of tubing.

19. Apparatus for the recovery of oil from an oil bearing formation penetrated by a well bore comprising:

(a) a string of casing positioned within said well bore;

(b) said string of casing including an upper portion of electrically conductive material extending to the surface and a lower portion of electrically conductive material positioned with at least a portion thereof in said formation, insulating means for electrically insulating said lower portion from said upper portion;

(c) a string of tubing of electrically conductive material positioned within said casing and extending from the surface into the lower portion of said string of casing;

(d) insulating means for electrically insulating said string of tubing from the upper portion of said string of casing; and (e) conductive means including said string of tubing connected to a source of supply voltage for providing a low resistance electrical circuit through said lower portion and water positioned in the formation adjacent said well bore;

(f) the upper portion of casing being spaced apart from the lower portion a distance that the current path between the upper and lower portions through the formation is sufficiently long to provide a resistance required to produce a desired amount of heating of the water in the formation.

20. Apparatus as defined in claim 19 wherein said conductive means includes means for electrically connecting said string of tubing to the lower portion of said string of casing and means for connecting a source of supply voltage across said tubing and the upper portion of said casing.

21. Apparatus as defined in claim 19 wherein said insulating means comprises a plurality of insulating elements positioning said tubing in the upper portion of the casing to maintain separation between said tubing and said upper portion.

22. Apparatus as defined in claim 21 further including a fluid filling the annulus between said tubing and said upper portion for further insulating said tubing from said upper portion.

23. Apparatus as defined in claim 19 wherein said upper and lower portions are mechanically connected and electrically insulated from one another by a body of concrete.

24. Apparatus for the recovery of oil from an oil bearing formation penetrated by a well bore comprising:

(a) a string of casing positioned within said well bore and including an upper portion of electrically conductive material extending to the surface and a lower portion of insulating material positioned at least partially in said formation;

(b) a string of tubing electrically conductive material positioned within said casing and extending from the surface into the formation;

(c) insulating means for electrically insulating said tubing from the upper portion of the casing; and (d) conductive means including said string of tubing connected to a source of supply voltage for providing a low resistance electrical path through water positioned in said formation adjacent said well bore;

(e) said lower portion of said casing being sufficiently long that the current path between the tubing and the upper portion of said casing is through the formation and sufficiently long to provide a resistance required to produce a desired amount of heating of the water in the formation.

25. Apparatus as defined in claim 24 wherein said conductive means include means for connecting a source of supply voltage across said tubing and the upper portion of said casing.

26. Apparatus as defined in claim 24 wherein said insulating means comprises a plurality of insulating elements positioning said tubing in the upper portion of the casing to maintain separation between the tubing and the upper portion.

27. Apparatus as defined in claim 26 further including a fluid filling the annulus between the tubing and the upper portion for further insulating the tubing from the upper portion.

References Cited

UNITED STATES PATENTS

| | | | |
|---|---|---|---|
| 2,795,279 | 6/1957 | Sarapuu | 166—248 |
| 3,141,504 | 7/1964 | Sarapuu | 166—248 |
| 3,149,672 | 9/1964 | Orkiszewski et al. | 166—248 |
| 849,524 | 4/1907 | Baker | 166—39 |
| 1,372,743 | 3/1921 | Gardner | 166—60 X |
| 1,784,214 | 12/1930 | Workman | 166—60 |
| 2,597,261 | 5/1952 | Rhoads | 166—60 X |
| 2,801,090 | 7/1957 | Hoyer et al. | 166—60 X |
| 3,106,244 | 10/1963 | Parker | 166—11 |
| 3,137,347 | 6/1964 | Parker | 166—39 |

STEPHEN J. NOVOSAD, Primary Examiner

U.S. Cl. X.R.

166—60, 272